Oct. 18, 1927.

G. MOSCATE

TIRE ALARM

Filed April 1, 1926

1,646,164

Inventor
Guy Moscate,
By Clarence A. O'Brien
Attorney

Patented Oct. 18, 1927.

1,646,164

UNITED STATES PATENT OFFICE.

GUY MOSCATE, OF SALAMANCA, NEW YORK.

TIRE ALARM.

Application filed April 1, 1926. Serial No. 99,030.

This invention relates to an alarm for indicating when a tire of a motor vehicle has been partially or totally deflated, in order that the operator may be warned of the fact before the tire is ruined by running upon the same.

The primary object of the invention is to provide an alarm of this character that is of extremely simple construction and that may be attached in position adjacent the tire in an easy and simple manner, and that operates efficiently under all conditions.

An additional object of the invention is to provide an alarm that consists of an electrical indicating means adapted to be mounted upon the instrument board or upon the steering post of the vehicle, and that is in normally open circuit with the storage battery of the vehicle through medium of a novel switch mechanism that is adapted for disposition upon a vehicle spring directly inwardly of one of the wheels thereof, said switch construction including a movable contact member provided with an operating arm that is normally maintained in position above the road surface by the tire when inflated, the same however being so adapted to engage the road when the tire becomes partially or totally deflated for moving the contact into the stationary contact of the switch construction for completing said circuit and operating the alarm.

Other objects will become apparent as the nature of the invention is better understood, the same comprising the novel form, combination and arrangement of parts hereinafter more fully described, shown in the accompanying drawing and claimed.

In the drawing wherein like reference characters indicate corresponding parts throughout the various views.

Figures 1, 2:
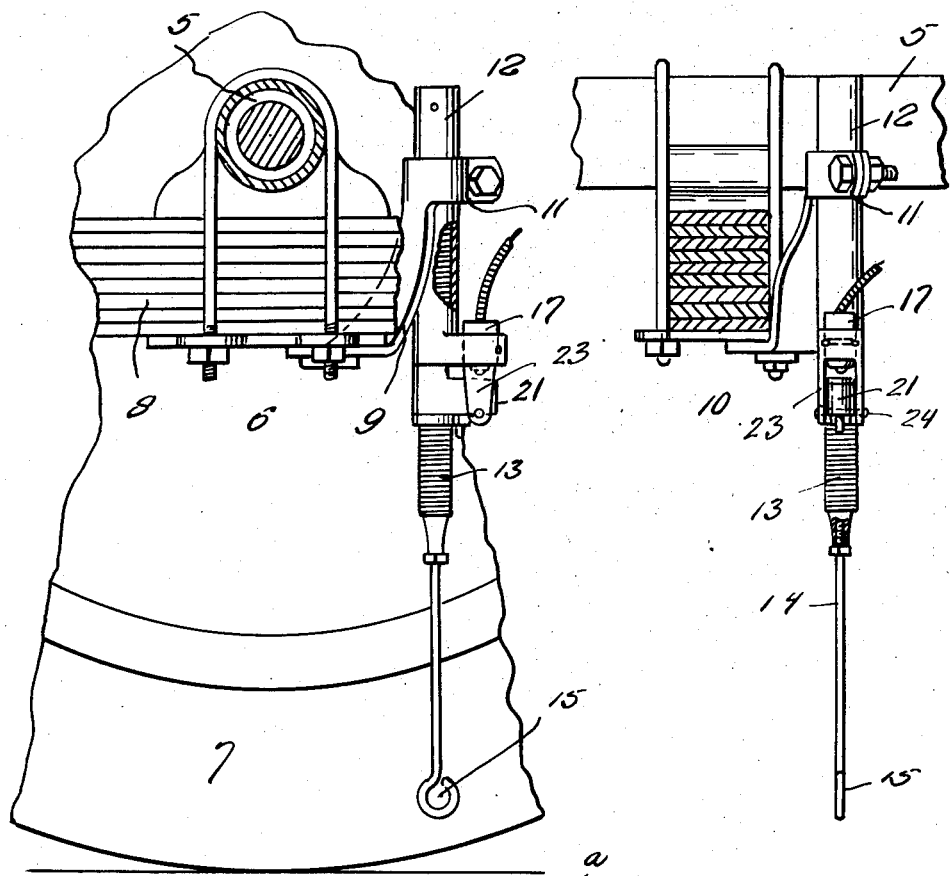
Figure 1 is a sectional view through a vehicle axle at the point of spring connection directly inwardly of the adjacent wheel upon the end of the axle, said wheel and spring being fragmentarily shown, the switch construction comprising the most essential feature of the present invention being arranged upon said spring at the rear side of the axle and in vertically depending relation therewith.
Figure 2 is a vertical section through the spring shown in Figure 1 for disclosing said switch construction in rear side elevation.
Figure 3:
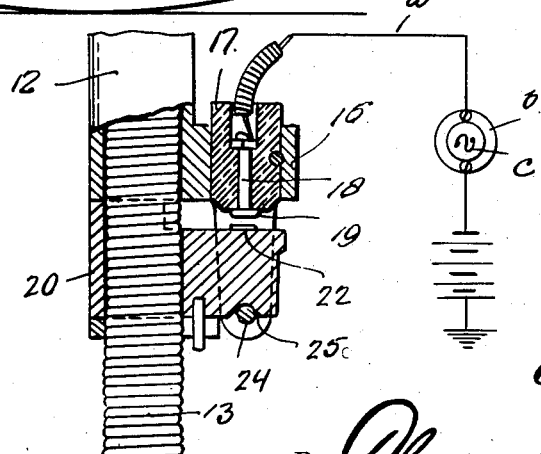
Figure 3 is an enlarged detail fragmentary vertical section of the switch construction for more clearly disclosing the stationary and movable contact points thereof.

Now having particular reference to the drawing, 5 indicates an automobile axle which in the present instance is disclosed as the rear axle construction of the vehicle. Journaled upon one end thereof is the usual wheel 6 that carries a pneumatic tire 7. The spring suspension unit between the vehicle frame and said axle is designated generally by the reference character 8. My invention per se constitutes the provision of a metallic bracket arm 9 that is provided at its lower end with an angularly bent portion 10 for engagement beneath the spring 8 and for attachment thereto by the usual bolt and nut connection between the spring and axle. Said bracket arm is secured to the spring rearwardly of the axle 5 and adjacent the wheel 6, the same extending upwardly therefrom and being formed at its upper end with a spring clamp 11, for adjustably securing to the arm a relatively elongated metallic sleeve 12 within which is frictionally secured the upper end of a spring rod 13 to the lower end of which is connected a solid rod 14, the lower end of which is headed as at 15 and that when the switch construction is properly mounted will terminate in slight spaced relation with the surface of the roadway when tire 7 upon the wheel 6 is fully inflated.

The lower end of the sleeve 12 is formed with a rearwardly extending lug 16 that is formed with a vertical opening for receiving a plug 17 of porcelain, fiber, or other nonconducting material which is adapted to be secured within the opening in any manner desirable.

Embedded within said plug 17 is a contact pin 18, the lower end of which extends through the plug and is headed as at 19. Said pin 18 is electrically connected by reason of a wire $a$ to one terminal of an electric lamp socket $b$ that is adapted to be mounted upon the instrument board of the machine or upon the steering wheel or post as desired. Arranged within said socket is an electric lamp $c$ while the other terminal of the socket is electrically connected to one post of the vehicle storage battery X, the other post thereof being grounded to the machine frame.

Arranged upon the flexible rod 13 directly beneath the elongated sleeve 12 is a collar 20 that is formed with a rearwardly extending lug 21 directly beneath the lug 16 of the sleeve 12 and upon the top surface of which is a contact disc 22 that will engage the head 19 of the pin 18 when the flexible rod is forced rearwardly by the action of the solid rod coming into engagement with the ground for closing the circuit to the bulb c and thus indicating to the driver that the particular tire has become totally or partially deflated.

In order that the contact carrying lugs of the sleeves 12 and 20 respectively will be maintained in position for securing the positive engagement of the contact, said lug 16 is formed at opposite sides of the plug 17 with depending fingers 23 that engage along opposite sides of the lug 21 of the sleeve 20 and that are interconnected beneath said lug by a cross pin 24 that engages within a cross notch 25, the lower side of said lug.

It will thus be readily understood that when the switch construction is arranged as more clearly disclosed in Figures 1 and 2 when the tire 7 is fully inflated, the head 15 of the solid rod will be in spaced relation with the surface of the road. By the action of the spring rod 13 the contacts 19 and 22 will be maintained separated. However, should the tire become deflated to the extent to permit the head 15 of the rod to engage the road, the movement of the machine will cause the rearward swinging thereof for obviously moving the contact 22 into engagement with the contact 19 for thus completing the circuit through the battery to the bulb C and indicating the condition of the tire to the driver.

Obviously, an automobile could be equipped with four of such devices in order that the driver could be warned should any one of the tires become deflated. However, I have found by actual experience that it is only necessary to provide two of the devices for the rear wheels as the driver will readily ascertain the condition of the front tires due to the effect that even a partial deflation thereof would have upon the steering mechanism.

Having thus described the invention, what I claim as new and desire to secure by Letters Patent is:—

1. A device of the class described including, in combination, a bracket adapted to be mounted upon a stationary member of a vehicle at the inner side of one of the wheels thereof, a depending sleeve mounted upon the bracket, a flexible bar secured at one end within said sleeve and having the other end projecting therefrom, a stationary contact secured to the sleeve, a contact secured to the flexible bar directly beneath said stationary contact and adapted to be engaged with said stationary contact when the lower end of the bar is flexed rearwardly.

2. A device of the class described including a sleeve, a flexible bar secured at one end within said sleeve, and the other end of the bar extending therefrom, a stationary contact secured to the sleeve, a contact secured to the projecting portion of the bar beneath said stationary contact and adapted to be moved into engagement with the stationary contact when the lower end of the bar is flexed.

3. A device of the class described including, in combination, a member adapted to be rigidly supported, a flexible bar secured at one end to the member and having the other end extending therefrom, a stationary contact secured to the member, a contact secured to the projecting portion of the bar, and guide means on the member so that when the rod flexes between said guide means the contact thereon engages the stationary contact.

In testimony whereof I affix my signature.

GUY MOSCATE.